United States Patent
Matsumoto et al.

(10) Patent No.: US 10,283,146 B2
(45) Date of Patent: May 7, 2019

(54) SYSTEM AND METHOD FOR READING DATA RECORDED ON FERROELECTRIC STORAGE MEDIUM BY MEANS OF A NEAR-FIELD TRANSDUCER

(71) Applicant: Western Digital Technologies, San Jose, CA (US)

(72) Inventors: Takuya Matsumoto, Sunnyvale, CA (US); Barry C. Stipe, San Jose, CA (US); Ikuya Tagawa, Hiratsuka (JP); Roger W. Wood, Gilroy, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/944,074

(22) Filed: Apr. 3, 2018

(65) Prior Publication Data
US 2018/0350397 A1    Dec. 6, 2018

Related U.S. Application Data

(60) Provisional application No. 62/515,887, filed on Jun. 6, 2017.

(51) Int. Cl.
| | |
|---|---|
| *G11B 11/00* | (2006.01) |
| *G11B 5/31* | (2006.01) |
| *G11B 5/60* | (2006.01) |
| *G11B 5/00* | (2006.01) |
| *G11B 7/126* | (2012.01) |

(52) U.S. Cl.
CPC ............ *G11B 5/314* (2013.01); *G11B 5/6082* (2013.01); *G11B 5/6088* (2013.01); *G11B 7/126* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 4,785,437 | A * | 11/1988 | Dransfeld | G11B 9/02 365/109 |
| 5,481,527 | A * | 1/1996 | Kasanuki | B82Y 10/00 365/117 |
| 5,606,541 | A * | 2/1997 | Finkelstein | G11B 7/126 369/112.16 |
| 5,680,386 | A * | 10/1997 | Le Carvennec | G11B 7/0045 369/100 |

(Continued)

OTHER PUBLICATIONS

Forrester, et al., "Charge-based scanning probe readback of nanometer-scale ferroelectric domain patterns at megahertz rates," Nanotechnology, 2009, vol. 20, No. 22.

*Primary Examiner* — Tan X Dinh
(74) *Attorney, Agent, or Firm* — Foley & Lardner LLP (57) ABSTRACT

According to one embodiment, a system includes a head, where the head includes: an optical signal source configured to emit a first optical signal, and a near-field transducer (NFT) configured to focus the first optical signal on a moving ferroelectric storage medium positioned below the head. The system also includes a detector operatively coupled to the head, where the detector is configured to detect a second optical signal generated in and reflected from the ferroelectric storage medium, and where the second optical signal has twice the optical frequency as the first optical signal.

19 Claims, 7 Drawing Sheets

(56) References Cited

U.S. PATENT DOCUMENTS

| | | | | |
|---|---|---|---|---|
| 6,028,835 | A * | 2/2000 | Thomas | G11B 9/02 369/121 |
| 6,046,973 | A * | 4/2000 | Thomas | G11B 9/02 369/126 |
| 6,597,639 | B1 * | 7/2003 | Hamann | G11B 9/02 369/126 |
| 7,149,180 | B2 | 12/2006 | Onoe et al. | |
| 7,852,738 | B2 | 12/2010 | Jeon et al. | |
| 7,901,804 | B2 | 3/2011 | Hong et al. | |
| 8,787,130 | B1 * | 7/2014 | Yuan | G11B 5/65 360/135 |
| 8,867,322 | B1 * | 10/2014 | Chernyshov | G11B 5/7325 360/131 |
| 9,886,977 | B1 * | 2/2018 | Mryasov | G11B 5/66 |
| 9,953,665 | B1 * | 4/2018 | Sakane | G11B 5/40 |
| 10,090,014 | B1 * | 10/2018 | Ajan | G11B 5/8404 |
| 2002/0136927 | A1 * | 9/2002 | Hieda | G11B 5/74 428/845.5 |
| 2004/0246564 | A1 | 12/2004 | Liao | |
| 2005/0052984 | A1 * | 3/2005 | Hong | B82Y 10/00 369/126 |
| 2005/0128616 | A1 | 6/2005 | Johns et al. | |
| 2006/0023606 | A1 * | 2/2006 | Lutwyche | G11B 9/02 369/100 |
| 2008/0180985 | A1 * | 7/2008 | Kim | G11B 9/02 365/145 |
| 2014/0362472 | A1 * | 12/2014 | Sakawaki | G11B 5/66 360/110 |
| 2017/0370770 | A1 * | 12/2017 | Kiely | G01K 7/16 |

\* cited by examiner

No electrically conductive layer: 15 MV/m electric field intensity

FIG. 8

Electrically conductive: 53 MV/m electric field intensity

FIG. 9

SYSTEM AND METHOD FOR READING DATA RECORDED ON FERROELECTRIC STORAGE MEDIUM BY MEANS OF A NEAR-FIELD TRANSDUCER

CROSS REFERENCE TO RELATED APPLICATIONS

This application claims priority from U.S. Provisional Application No. 62/515,887, filed Jun. 6, 2017, incorporated by reference in its entirety.

FIELD

The present disclosure relates to data storage systems, and more particularly, this disclosure relates to near field optical transducers particularly configured for use with ferroelectric storage media, and methods of making the same.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to meeting this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles. For instance, the ongoing push for higher storage bit densities in magnetic media used in disk drives has reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, and occurs where the average thermal energy ($k_B T$) within the grain becomes proportional to the magnetic anisotropy energy ($K_u V$), where $k_B$ is Boltzmann's constant, T is the absolute temperature, $K_u$ is the magnetic anisotropy constant of the grain, and V is the volume of the grain. Conventional magnetic recording media are thus limited to about 1 Terabit per square inch due to the limited magnetic anisotropy energy ($K_u V$) of current Co—Cr based materials (e.g., CoCrPt).

The superparamagnetic limit may be raised by increasing the coercivity of the magnetic media or lowering the temperature. Lowering the temperature may not be practical when designing hard disk drives for commercial and consumer use. Raising the magnetic anisotropy (and thus the coercivity) of the media, on the other hand, may exceed the write field capability of the write head.

Several techniques, such as heat assisted magnetic recording (HAMR) and microwave assisted magnetic recording (MAMR), have emerged to address the difficulty in maintaining both the thermal stability and write-ability of the magnetic media. For instance, HAMR employs heat to lower the effective coercivity of the magnetic media used to store data, whereas MAMR employs a high-frequency oscillating magnetic field (in addition to a recording magnetic field emanated from a main pole of the write element) to lower the effective coercivity of said media. However, current materials having a magnetic anisotropy (e.g., FePt), which may be particularly useful in HAMR and MAMR applications, have not been shown to exceed current Co—Cr based media in terms of recording capability.

Ferroelectric recording media has also garnered recent interest. Ferroelectric materials store information in the form of the upward or downward electric polarization direction of individual domains. While ferroelectric recording media are capable of storing data at very high areal densities, problems exist with respect to current methods for recovering the stored information (i.e., current readback mechanisms). For instance, screening charges (e.g., electrons or ions) located at the surface or at interfaces between a ferroelectric layer and adjacent layers in a ferroelectric recording medium may cancel external electric fields, which may enhance the stability of the medium for data storage but also complicate the readback process. There is thus a need in the art for an improved system and/or method of reading back information stored on ferroelectric recording media.

SUMMARY

According to one embodiment, a system includes a head, where the head includes: an optical signal source configured to emit a first optical signal, and a near-field transducer (NFT) configured to focus the first optical signal on a moving ferroelectric storage medium positioned below the head. The system also includes a detector operatively coupled to the head, where the detector is configured to detect a second optical signal generated in and reflected from the ferroelectric storage medium, and where the second optical signal has twice the optical frequency as the first optical signal.

Any of these embodiments may be implemented in a data storage system such as a disk drive system, which may include a head (e.g., a write and/or read head), a drive mechanism for passing a storage medium (e.g., hard disk) over the head, and a controller electrically coupled to the head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features and embodiments/approaches described herein can be used in combination with other described features and embodiments/approaches according to various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

As also used herein, the term "about" when combined with a value refers to plus and minus 25% of the reference value. For example, a length of about 10 nm refers to a length of 10 mm±2.5 mm, etc.

The following description discloses several preferred embodiments of disk-based storage systems and/or related systems and methods, as well as operation and/or component parts thereof.

According to one general embodiment, a system includes a head, where the head includes: an optical signal source configured to emit a first optical signal, and a near-field transducer (NFT) configured to focus the first optical signal on a moving ferroelectric storage medium positioned below the head. The system also includes a detector operatively coupled to the head, where the detector is configured to detect a second optical signal generated in and reflected from the ferroelectric storage medium, and where the second optical signal has twice the optical frequency as the first optical signal.

Figure 1:
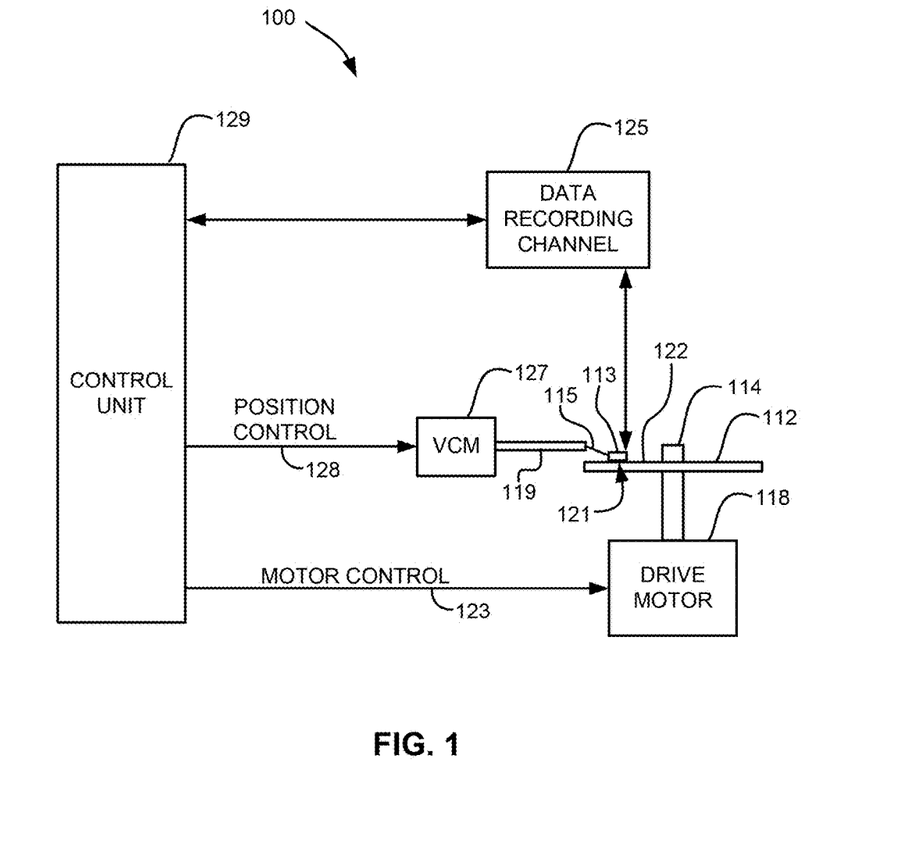
FIG. 1 is a simplified drawing of a magnetic recording disk drive system, according to one embodiment.

Referring now to FIG. 1, there is shown a disk storage system (e.g., a disk drive) 100 in accordance with one embodiment of the present invention. The disk storage system 100 includes at least one rotatable medium (e.g., magnetic disk, a ferroelectric disk, etc.) 112 supported on a spindle 114 and rotated by a drive mechanism, which may include a disk drive motor 118. The recording on each disk is typically in the form of an annular pattern of concentric data tracks (not shown) on the disk 112. Thus, the disk drive motor 118 preferably passes the disk 112 over the read/write portions 121, described immediately below.

At least one slider 113 is positioned near the disk 112, each slider 113 supporting one or more read/write portions 121, e.g., of a head structure according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system 100, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125.

The above description of a disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

As indicated above, the disk storage system 100 may be a magnetic disk drive in some approaches, and therefore include a magnetic head. In a conventional magnetic disk drive, an exemplary magnetic head may include an inductive write portion which therein includes a coil layer embedded in one or more insulation layers (insulation stack), the insulation stack being located between first and second pole piece layers. A gap may be formed between the first and second pole piece layers by a gap layer at an air bearing surface (ABS) of the write portion. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in tracks on a rotating magnetic disk. The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2:
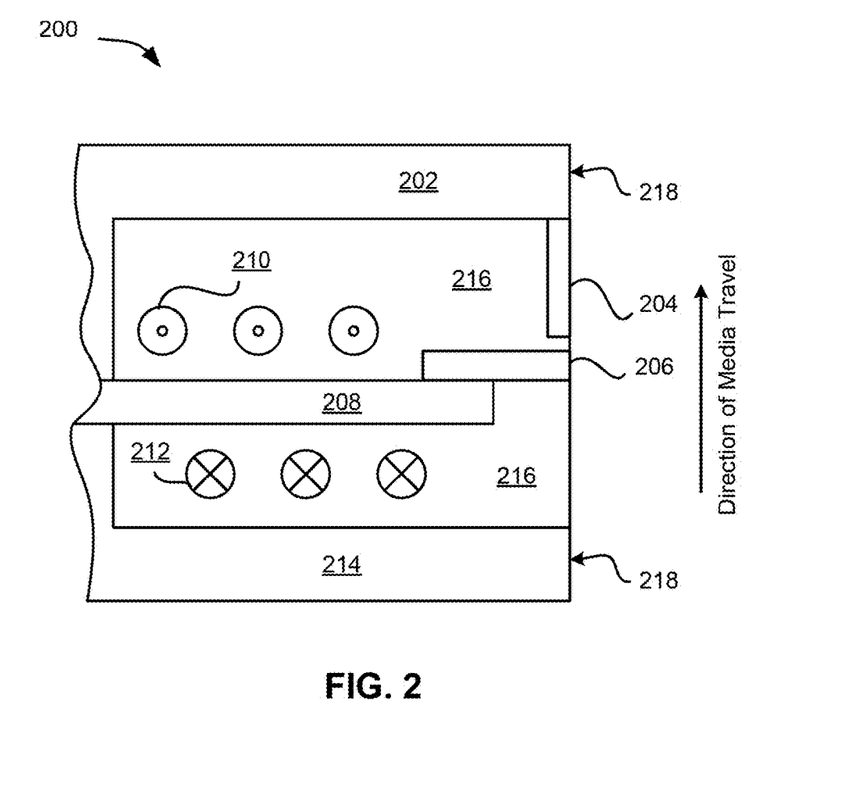
FIG. 2 is a cross-sectional view of a perpendicular magnetic head with helical coils, according to one embodiment.

FIG. 2 is a cross-sectional view of a perpendicular magnetic head 200, according to one particular embodiment. In FIG. 2, helical coils 210 and 212 are used to create magnetic flux in the stitch pole 208, which then delivers that flux to the main pole 206. Coils 210 indicate coils extending out from the page, while coils 212 indicate coils extending into the page. Stitch pole 208 may be recessed from the ABS 218. Insulation 216 surrounds the coils and may provide support for some of the elements. The direction of the media travel, as indicated by the arrow to the right of the structure, moves the media past the lower return pole 214 first, then past the stitch pole 208, main pole 206, trailing shield 204 which may be connected to the wrap around shield (not shown), and finally past the upper return pole 202. Each of these components may have a portion in contact with the ABS 218. The ABS 218 is indicated across the right side of the structure.

Perpendicular writing is achieved by forcing flux through the stitch pole 208 into the main pole 206 and then to the surface of the disk positioned towards the ABS 218.

Figure 3:
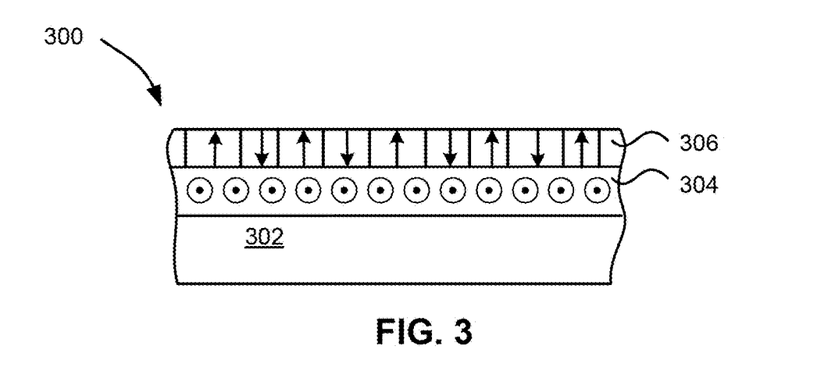
FIG. 3 is a schematic representation of a perpendicular magnetic recording medium, according to one embodiment.

FIG. 3 provides a schematic diagram of a simplified perpendicular magnetic recording medium 300, which may also be used with the disk recording system shown in FIG. 1. As shown in FIG. 3, the perpendicular magnetic recording medium 300, which may be a recording disk in various approaches, comprises at least a supporting substrate 302 of a suitable non-magnetic material (e.g., glass, aluminum, etc.), and a soft magnetic underlayer 304 of a material having a high magnetic permeability positioned above the substrate 302. The perpendicular magnetic recording medium 300 also includes a magnetic recording layer 306 positioned above the soft magnetic underlayer 304, where the magnetic recording layer 306 preferably has a high coercivity relative to the soft magnetic underlayer 304. There may one or more additional layers (not shown), such as an "exchange-break" layer or "interlayer", between the soft magnetic underlayer 304 and the magnetic recording layer 306.

The orientation of magnetic impulses in the magnetic recording layer 306 is substantially perpendicular to the surface of the recording layer. The magnetization of the soft magnetic underlayer 304 is oriented in (or parallel to) the plane of the soft magnetic underlayer 304. As particularly shown in FIG. 3, the in-plane magnetization of the soft magnetic underlayer 304 may be represented by an arrow extending into the paper.

Except as otherwise described herein with reference to the various inventive embodiments, the various components of the structures of FIGS. 1-3, and of other embodiments disclosed herein, may be of conventional material(s), design, and/or fabricated using conventional techniques, as would become apparent to one skilled in the art upon reading the present disclosure.

As discussed previously, one approach for increasing the recording density of a magnetic storage medium may include reducing the average volume of the magnetic crystal grains. Unfortunately, reducing the volume of the crystal grains may affect their thermal stability. For example, thermal stability is given by: $K_u V/k_B T$, where $K_u$ denotes the magnetocrystalline anisotropy, $V$ is the grain volume, $k_B$ denotes the Boltzmann constant, and $T$ denotes the temperature. Preferably, $K_u V/k_B T > \sim 60$ to avoid thermal decay. To compensate for the reduction in average volume, $V$, of the magnetic nanoparticles, the magnetic anisotropy ($K_u$) of the magnetic nanoparticles may be increased to maintain thermal stability. However, increasing the magnetic anisotropy also increases the coercivity of the ferromagnetic recording material, which may exceed the switching field (i.e., the write field) capability of the write head.

Heat assisted magnetic recording (HAMR), and microwave assisted magnetic recording (MAMR), have emerged as viable techniques for recording to magnetic materials having a high coercivity (e.g., FePt). For instance, HAMR employs heat to lower the effective coercivity of a localized region of the magnetic media and write data therein. The data state becomes stored, or "fixed," upon cooling the magnetic media to ambient temperatures (i.e., normal operating temperatures typically in a range between about 15° C. and 60° C.). In MAMR, an oscillation element or device is located next to or near the write element in order to produce a high-frequency oscillating magnetic field (in addition to a recording magnetic field emanated from a main pole of the write element), which reduces an effective coercivity of a magnetic recording medium used to store data. However, HAMR and MAMR techniques have been unable to exceed the high recording densities (e.g., about 1 Terabit per square inch) achieved with conventional magnetic recording techniques that utilize conventional CoPtCr materials.

Recent studies on ferroelectric storage media have also emerged. Ferroelectric materials have spontaneous electric polarization (i.e., internal dipoles) that may be reversed by an external electric field. Information may thus be recorded in a ferroelectric storage medium such that the internal dipole of a domain is fixed in a first vertical polarization direction or a second vertical polarization direction, the second vertical polarization being opposite to (e.g., 180 degrees relative to) the first vertical polarization direction. As used herein, the aforementioned vertical direction may correspond to the direction perpendicular to the upper surface of the storage medium. Ferroelectric domains formed from charged regions may be significantly smaller than magnetic domains while remaining thermally stable; thus, ferroelectric storage media may achieve higher areal densities as compared to conventional magnetic storage media.

Writing/recording information in a ferroelectric storage medium may typically involve generation of an intense electric field between the pole/probe tip of a write head and an electrically conductive layer of the storage medium, where the electrically conductive layer is positioned below a layer comprising ferroelectric materials (i.e., a ferroelectric layer). Application of this electric field forms the ferroelectric domains polarized in a first vertical direction (e.g., an upward direction) or a second vertical direction (e.g., a downward direction), as indicated above.

The stability of the ferroelectric storage medium (i.e., the ability to maintain the spontaneous polarization of the medium) may be affected by the presence of screening charges (e.g., electrons or ions) located at the surface or at interfaces between the ferroelectric layer and adjacent layers in the storage medium. Theses screening charges may cancel internal depolarizing fields and thus enhance the storage of information in the medium in some instances.

However, due to the presence of these screening charges, the readback of information stored in the medium may be achieved only via indirect measurements of the polarity of the medium. For instance, the axial response of the medium to electric fields becomes asymmetric, and the asymmetry depends on the polarity of the stored information bits.

Embodiments disclosed herein are directed to novel systems and methods for retrieving stored information in a moving (e.g., rotating) ferroelectric storage medium using a read head comprising a near-field optical transducer. In preferred approaches, the near-field transducer may be configured to produce an intense, localized oscillating electrical field perpendicular to the surface, and along the easy axis, of the ferroelectric storage medium. In various approaches, the ferroelectric storage medium may include an electrically conductive layer below the ferroelectric layer (i.e., the layer in which the information is stored). The ferroelectric layer may preferably include ferroelectric materials that exhibit nonlinear optical activity (i.e., respond non-linearly to the oscillating electric field of the incident optical beam). In particular approaches, the ferroelectric material may frequency double the incident optical beam, thereby generating a second optical beam having twice the frequency as the incident optical beam, a process also referred to as second harmonic generation. The phase of this generated second harmonic (the second optical beam) may thus be measured to ultimately determine the polarity of the stored information bits stored in the ferroelectric storage medium. In various approaches, measuring the phase of the generated second harmonic (the second optical beam) may be achieved by comparing the phase of the generated second harmonic with that of a reference optical beam generated in the read head.

Figure 4:
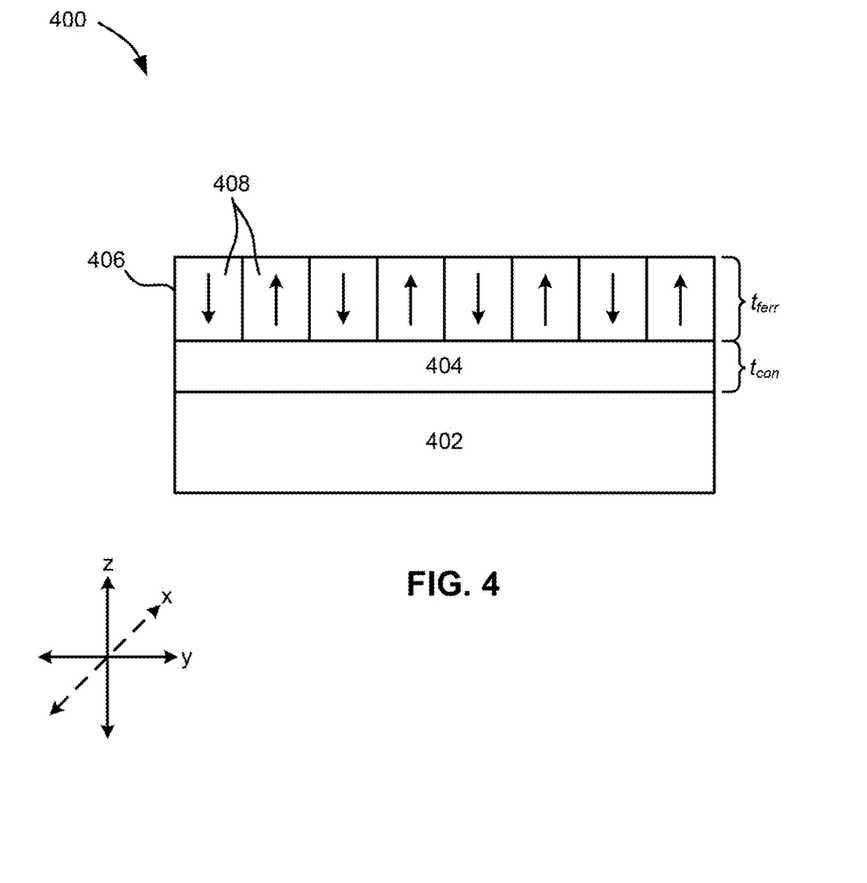
FIG. 4 is a schematic representation of a ferroelectric storage medium, according to one embodiment.

Referring now to FIG. 4, a ferroelectric storage medium (e.g., a ferroelectric hard disk) is shown according to one embodiment. It should be noted that the terms "ferroelectric storage medium" and "ferroelectric recording medium" may be used interchangeably herein. As an option, the ferroelectric storage medium 400 may be implemented in conjunction with features from any other embodiment listed herein, such as those described with reference to the other FIGS. Of course, the ferroelectric storage medium 400 and others presented herein may be used in various applications and/or in permutations which may or may not be specifically described in the illustrative figures.

For instance, more or less layers than those specifically described in FIG. 4 may be included in the ferroelectric storage medium 400 according to various embodiments. Moreover, unless otherwise specified, one or more components/features of the ferroelectric storage medium 400 may be of conventional material(s), design, and/or fabricated using conventional techniques as would become apparent to one skilled in the art upon reading the present disclosure.

As shown in FIG. 4, the ferroelectric storage medium 400 may include a substrate 402. Suitable materials for the substrate may include, but are not limited to, aluminum, glass, silicon, etc.

The ferroelectric storage medium 400 may include an electrically conductive layer 404 positioned above the substrate 402 and below the ferroelectric layer 406. The electrically conductive layer 404 may preferably be electrically conductive at low frequencies up to 1 GHz to help create an intense vertical electric field during writing. Additionally, the electrically conductive layer 404 may act as a conductor or have very low impedance at optical frequencies to create and confine the intense vertical electric fields at optical frequencies during readback. Moreover, the electrically conductive layer 404 may also be configured to dissipate unnecessary heat that develops in the ferroelectric medium during readback.

Suitable materials for the electrically conductive layer 404 may include, but are not limited to, one or more metals (e.g., Pt, Al, Au, Ag and Cu), one or more metal oxides, combinations thereof, etc. In some approaches, the thickness, $t_{con}$, of the electrically conductive layer 404, as measured in the vertical direction (direction parallel to the z-axis of FIG. 4), may be in a range from about 1 nm up to the thickness of a metal substrate.

The ferroelectric storage medium 400 may also include a ferroelectric layer 406 positioned above the electrically conductive layer 404. The ferroelectric layer 406 includes a plurality of ferroelectric domains 408. The direction of polarization of the ferroelectric domains 408 may be controlled via application of an electric field to the ferroelectric storage medium 400.

In preferred approaches, the ferroelectric layer may include nonlinear, optically active ferroelectric materials. For example, the ferroelectric layer may include ferroelectric materials configured to frequency double incident electromagnetic radiation. In particular approaches, the ferroelectric materials may be configured to frequency double incident red (or infrared light), thereby generating blue (or green light) at twice the optical frequency of the incident red (or infrared) light. It is important to note, that the easy axis of the ferroelectric materials is oriented perpendicular to the plane of the ferroelectric layer 406 (which extends along an x-y plane shown in FIG. 4).

Suitable materials for the ferroelectric layer 406 include, but are not limited to, $LiNbO_3$, $LiTaO_3$, $BaTiO_3$, $SrTiO_3$, $KTiOPO_4$, $PbTiO_3$, $KH_2PO_4$, $\beta\text{-}BaB_2O_4$, $LiB_3O_5$, etc.

In some approaches, the thickness, $t_{ferr}$, of the ferroelectric layer 406, as measured in the vertical direction, may be in a range from about 8 nm to about 20 nm.

While not shown in FIG. 4, one or more additional layers may be present between the electrically conductive layer 404 and the ferroelectric layer 406. For example, a seed layer may be present below the ferroelectric layer to promote formation (e.g., grain growth) of the ferroelectric layer 406. However, in other approaches, the ferroelectric layer 406 may be positioned directly on the electrically conductive layer 404.

Moreover, while also not shown in FIG. 4, one or more additional layers may also be present above the ferroelectric layer 406, such as a protective overcoat layer (e.g., comprising diamond like carbon, carbon nitride, Si-nitride, BN, etc.) and a lubricant layer (e.g., comprising a perfluoropolyether, a fluorinated alcohol, fluorinated carboxylic acids, etc.). These one or more additional layers present above the ferroelectric layer 406 may also be configured to facilitate the response of surface charges during writing and storage processes. Preferably, these surface charges are substantially immobile during a high-speed writing process, but redistribute to stabilize the ferroelectric storage medium 400 during storage. Accordingly, the one or more additional layers present above the ferroelectric layer 406 may comprise materials that are selected to, and are each configured to, control the time-constant of the redistribution of the surface charges.

Figure 5:
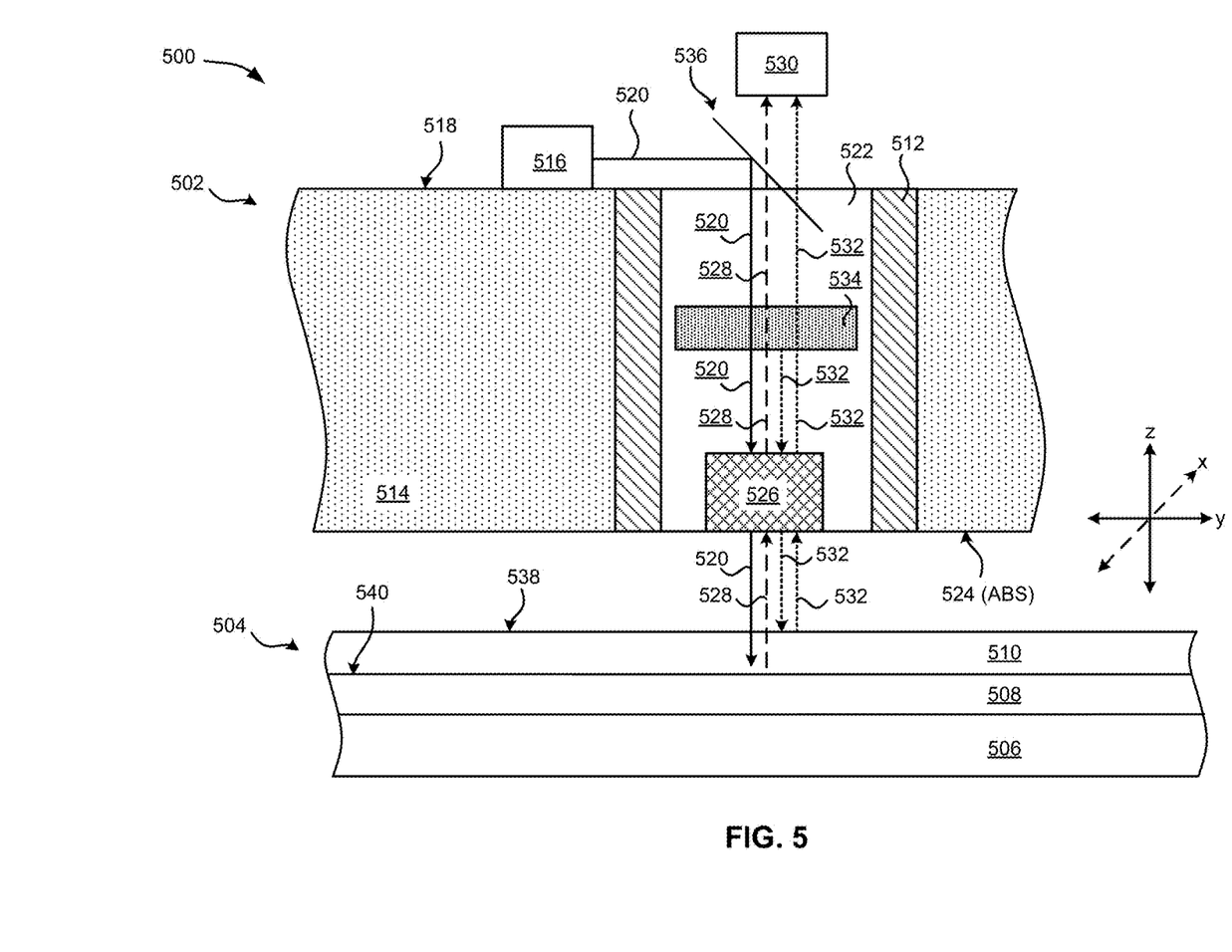
FIG. 5 is a schematic representation of a ferroelectric data storage system, according to one embodiment.

Referring now to FIG. 5, a ferroelectric data storage system 500 is shown according to one embodiment. As an option, the ferroelectric data storage system 500 may be implemented in conjunction with features from any other embodiment listed herein, such as those described with reference to the other FIGS. Of course, the ferroelectric data storage system 500 and others presented herein may be used in various applications and/or in permutations which may or may not be specifically described in the illustrative embodiments listed herein.

It should be noted that the dimensions of some components illustrated in FIG. 5 may be exaggerated (e.g., larger and/or smaller than would typically be observed) relative to other components, which are in no way intended to limit the invention. Moreover, to simplify and clarify the structures presented, certain features may be omitted from the subsequent figures and/or descriptions. For instance, although FIG. 5 depicts an illustrative cross-sectional view of a ferroelectric data storage system 500, additional and/or alternative components, layers, etc. may be used in the system as would become apparent to one of ordinary skill in the relevant art upon reading the present disclosure. Moreover, unless otherwise specified, one or more components of the ferroelectric data storage system 500 may be of conventional material(s), design, and/or fabricated using conventional techniques as would become apparent to one skilled in the art upon reading the present disclosure.

As shown in FIG. 5, the ferroelectric data storage system includes a head 502 configured to write and/or read information from a moving (e.g., rotating) ferroelectric storage medium 504. The ferroelectric storage medium 504 may comprise one or more features, layers, materials, dimensions, etc. of the ferroelectric storage medium 400 illustrated in FIG. 4. In preferred approaches, the ferroelectric storage medium 504 of FIG. 5 may include at least the following layers: a substrate 506, an electrically conductive layer 508 above the substrate 506, and a ferroelectric layer 510 above the electrically conductive layer 508.

The head 502 may particularly include a read head 512, and one or more insulation layers 514, e.g., comprising alumina, alumina/titanium-carbide ($Al_2O_3$/TiC), etc. The head 502 may also include a separate write head (not shown in FIG. 5) adjacent to the read head 512. One or more portions of the head 502, at or near the air bearing surface (ABS) 524 thereof, may further include a protective overcoat layer (also not shown in FIG. 5).

As shown in FIG. 5, an optical signal source 516, such as a laser, is operatively coupled to the upper surface 518 of the head 502. In some approaches, the optical signal source 516 may be in contact with the upper surface 518 of the head 502. In other approaches, the optical signal source 516 may be in contact with a separate component (e.g., a suspension component) that is operatively coupled to the upper surface 518 of the head 502.

In various approaches, the optical signal source 516 may be configured to generate a first optical signal 520 (e.g., light) at a first/fundamental wavelength. In preferred approaches, the first optical signal 520 has a wavelength in a range from about 600 nm to about 1400 nm with a coherence length of 1 mm or greater. In particular approaches, the optical signal source 516 may be configured to generate red and/or infrared light.

As noted above, the optical signal source 516 may be a laser. In such approaches, the laser may be configured to operate in a continuous or pulsed mode. As discussed in greater detail below, the first optical signal 520 may evoke a second harmonic response in the ferroelectric storage medium 504 such that a second optical signal having about twice the frequency (and half the wavelength) of the first optical signal 520 is generated in, and reflected from, said medium 504. Utilizing a laser configured to operate in a pulsed mode may thus be advantageous given the quadratic dependence of the frequency doubled response, and that the achievable data-rate is inversely proportional to the duty-cycle. Accordingly, in various approaches, the optical signal source 516 may be a pulsed laser configured to emit nanosecond pulses, picosecond pulses, femtosecond pulses, etc. at a predetermined repetition rate.

As also shown in FIG. 5, the read head 512 includes an optical waveguide 522, which may be optimized for at least the first optical signal 520. For instance, the optical waveguide 522 may be at least configured to direct, in a direction perpendicular (or substantially perpendicular) to the ABS 524 of the head 502, the first optical signal 520 towards a near-field transducer (NFT) 526 (e.g., a plasmonic device).

The optical waveguide 522 preferably includes one or more materials having a high refractive index that assists in keeping the first optical signal 520 within the optical waveguide 522. Illustrative materials for the optical waveguide 522 include, but are not limited to, $TaO_x$, $TiO_x$, $NbO_x$, $ZrO_x$, HfOx, $Ta_2O_5$, $TiO_2$, etc. While not shown in FIG. 5, one or more cladding layers may surround and be in contact with one or more portions of the optical waveguide 522. These one or more cladding layers may preferably include a material having a low refractive index (relative to the material of the optical waveguide 522) so as to further assist in keeping the first optical signal 520 confined within the sidewalls of the optical waveguide 522. Illustrative materials for these one or more cladding layers include, but are not limited to, $Al_2O_3$, $SiO_2$, etc.

In further approaches, the optical waveguide 522 may span the entire height of the read head 502, i.e., from the upper surface 518 thereof to the ABS 524. In alternative approaches, the optical waveguide 522 may span only a portion of the height of the head 502.

As further shown in FIG. 5, the NFT 526 may be located near or at the ABS 524 of the head 502. In some approaches, the NFT 526 may be operatively coupled to or in direct contact with the optical waveguide 522 (and any additional waveguides if present). In more approaches, the NFT 526 may be located between the ABS 524 and an output end face of the optical waveguide 522 (and any additional waveguides if present).

A preferred configuration of the NFT 526 includes a nanobeak design as described in detail in U.S. Pat. No. 8,619,516, which is herein incorporated by reference. However, the partial cross-sectional view of the read head 512 in FIG. 5 is not meant to limit the structure of the NFT 526 as described herein. Accordingly, the NFT 526 may embody an E-antenna, have a triangular shape, be a lollipop NFT, etc., as desired in various approaches.

In some approaches, the separation between the NFT 526 and the upper surface 538 of the ferroelectric storage medium 504, as measured in the vertical direction (the direction along the z-axis), may be in a range from about 3 nm to about 6 nm. In preferred approaches, the separation between the NFT 526 and the upper surface 540 of the electrically conductive layer 508, as measured in the vertical direction, may be in a range from about 11 nm to about 26 nm.

The NFT 526 may comprise one or more low-loss metals (e.g., Au, Ag, Al, Cu, etc.) and/or be shaped in such a manner so as to concentrate the first optical signal 520 into a small, localized region on the ferroelectric storage medium 504. In particular, the metal material(s) and/or configuration of the NFT 526 may create resonant charge motion (surface plasmons) to yield an intense, localized electric field between the NFT 526 and the electrically conductive layer 508 of the ferroelectric storage medium 504. This intense, localized electric field is perpendicular (or substantially perpendicular) to the plane of the ferroelectric storage medium 504 (which extends along an x-y plane shown in FIG. 5), and along (parallel or substantially parallel to) the easy axis of the ferroelectric storage medium 504.

The ferroelectric layer 510 of the ferroelectric storage medium 504 preferably exhibits a nonlinear response to the intense, incident optical signal (e.g., the first optical signal 520). More preferably, there is a strong even-order component to the nonlinearity, with the polarity of the even-order component being dependent on the polarity recorded into the ferroelectric storage medium 504. The second-order component of the non-linearity may thus act to create a second harmonic of the first optical signal 520. The second-harmonic optical response of the ferroelectric storage medium 504 thus generates the second optical signal 528 having twice the optical frequency (and half the wavelength) of the incident first optical signal 520. For instance, the incident, first optical signal 520 may be red light, and the second optical signal 528 may be blue light at twice the optical frequency (half the wavelength) of the incident red light, in one approach. Likewise, in another approach, the incident, first optical signal 520 may be infrared light, and the second optical signal 528 may be green light at twice the optical frequency (half the wavelength) of the incident red light.

As indicated above, the phase of the second optical signal 528 generated in the ferroelectric layer 510 of the ferroelectric storage medium 504 may change back and forth by 180 degrees in response to the polarity of the information stored in the ferroelectric layer 510. The second optical signal 528 may be reflected from the ferroelectric storage medium 504 and coupled into the NFT 526. The electric component of the second optical signal 528 may be oriented perpendicular (or substantially perpendicular) to the plane of the ferroelectric storage medium 504 (which extends along an x-y plane of FIG. 5).

As also discussed previously, the NFT 526 may be configured to be resonant at, and produce a very strong localized field for, the first optical signal 520. In additional approaches, the NFT 526 may also be configured to be resonant at the second optical signal 528 (e.g., the second harmonic response having twice the optical frequency, and half the wavelength, of the first optical signal 520). Such a configuration, where the NFT 526 may be resonant at both the first and second optical signals 520, 528, ensures that the NFT 526 has very localized sensitivity, and that the localized field for the first optical signal 520 is strong enough to evoke a suitable second-harmonic response, and the second harmonic response (e.g., the second optical signal 528) is sufficiently coupled back into the read head 512 for subsequent detection. In various approaches, the NFT 526 may thus be a composite structure comprising a first plasmonic material resonant at the first optical signal 520, and a second plasmonic material resonant at the second optical signal 528. This first plasmonic material may be particularly positioned at the surface and/or region of the NFT 526 on which the first optical signal 520 is incident, whereas the second, plasmonic material may be particularly positioned at the surface and/or region of the NFT 526 on which the second optical signal 528 is incident. In one approach, the first and second plasmonic materials may be gold and silver, respectively. It is of note that for a composite NFT that is resonant at two optical frequencies, both the selection of materials and the design of the NFT are critical.

As shown in the non-limiting embodiment of FIG. 5, once the second optical signal 528 is coupled into the NFT 526, the second optical signal 528 may be directed towards a detector 530 via the optical waveguide 522, in a direction perpendicular (or substantially perpendicular) to the ABS 524. Accordingly, the optical waveguide 522 may not only be optimized for the first optical signal 520, but also optimized for the second optical signal 528. The optical waveguide 522 may thus include one or more materials (e.g., $TaO_x$, $TiO_x$, $NbO_x$, $ZrO_x$, HfOx, $Ta_2O_5$, $TiO_2$, etc.) having a high refractive index to assist in keeping both the first and second optical signals 520, 528 within the optical waveguide 522.

It is important to note, however, that in other approaches, the optical waveguide 522 may only be optimized for the first optical signal 520 (e.g., red or infrared light). A second optical waveguide (not shown in FIG. 5) may therefore be operatively coupled to the read head 512 and optimized for (e.g., configured to guide) the second optical signal 528 (e.g., comprising blue or green light having twice the optical frequency of the incident first optical signal 520). In other words, a second optical waveguide may be configured to guide the second optical signal 528 towards the detector 530 in a direction perpendicular (or substantially perpendicular) to the ABS 524.

This second optical waveguide may particularly include one or more materials (e.g., $TaO_x$, $TiO_x$, $NbO_x$, $ZrO_x$, HfOx, $Ta_2O_5$, $TiO_2$, etc.) having a high refractive index to assist in keeping the second optical signal 528 within the optical waveguide. One or more cladding layers (e.g., comprising $Al_2O_3$, $SiO_2$, etc.) may also surround and be in contact with one or more portions of the second optical waveguide. These one or more cladding layers may preferably include a material having a low refractive index (relative to the material of the second optical waveguide) so as to further assist in keeping the second optical signal 528 confined within the sidewalls of the second optical waveguide. Moreover, the second optical waveguide may span the entire height of the read head 502, i.e., from the upper surface 518 thereof to the ABS 524 in various approaches. In alternative approaches, the second optical waveguide may span only a portion of the height of the head 502.

Again with reference to FIG. 5, the detector 530, operatively coupled to the head 502 and/or read head 512, may include a photodiode, but may also include other radiation detectors as would become apparent to one having skill in the art upon reading the present disclosure. Additional components (not shown in FIG. 5) may be operatively coupled to the detector 530 such as processing devices (e.g., including a preamplifier and readback channel) configured to process the resulting data, etc.

Although a photodiode can sense optical power, it cannot sense phase or polarization. As discussed herein, the polarity of the recorded information in the ferroelectric storage medium 504 may be determined by measuring the phase of the second optical signal 528. To detect the phase of the second optical signal 528 (and the polarity of the recorded data), the second optical signal 528 may be compared to a reference optical signal 532 with a known phase. This reference optical signal 532, while having the same optical frequency and polarization as the second optical signal 528, may preferably be stronger than the second optical signal 528. Prior to reaching the detector 530, the reference optical signal 532 generated in a ferroelectric reference layer 534 may thus be superimposed on the second optical signal 528, which is generated in, and reflected from, the ferroelectric layer 510 of the ferroelectric storage medium 504.

As indicated above, the reference optical signal 532 may preferably be generated from the first optical signal 520 (e.g., the red or infrared laser light) to ensure that the reference optical signal 532 is coherent with the second optical signal 528 and has the desired phase and polarization. Accordingly, the first optical signal 520, prior to reaching the NFT 526, may pass through the ferroelectric reference layer 534 configured to frequency double the first optical signal 520. The reference optical signal 532 at twice the optical frequency (and half the wavelength) of the first optical signal 520 may thus be generated in the ferroelectric reference layer 534 and subsequently propagate toward the NFT 526 and the upper surface 538 of the ferroelectric storage medium 504. This reference optical signal 532 may then be reflected from the NFT/medium interface and guided to the detector 530.

In some approaches, the reference optical signal 532 may be guided from the ferroelectric reference layer 534 to the detector 530 via the optical waveguide 522. In such approaches, the optical waveguide 522 may thus be optimized for the first optical signal 520 (e.g., light at fundamental wavelength, $n\lambda$), as well as the second and reference optical signals 528, 532 (e.g., light at the second harmonic wavelength, $n\lambda/2$). However, as also discussed herein, the optical waveguide 522 may only be optimized for the first optical signal 520; thus, a second optical waveguide (not shown in FIG. 5) may be included within the read head 512, and optimized for the second and reference optical signals 528, 532.

As shown in FIG. 5, the ferroelectric reference layer 534 may be operatively coupled to read head 512, and particularly, the optical waveguide 522. As also shown in FIG. 5, the ferroelectric reference layer 534 may be positioned between the upper surface 518 of the head 502 and the NFT 526.

In various approaches, the ferroelectric reference layer 534 may comprise one or more optically active ferroelectric materials including, but not limited to, $LiNbO_3$, $LiTaO_3$, $BaTiO_3$, $SrTiO_3$, $KTiOPO_4$, $PbTiO_3$, $KH_2PO_4$, $\beta$-$BaB_2O_4$, $LiB_3O_5$, etc. In some approaches, the ferroelectric reference layer 534 may include one or more of the same ferroelectric materials as the ferroelectric layer 510 of the ferroelectric storage medium 504. In other approaches, the ferroelectric reference layer 534 may include one or more different materials than the aforementioned ferroelectric layer 510.

Preferably, the ferroelectric reference layer 534 may have a thickness, as measured in the vertical direction (along the z axis in FIG. 5) that is greater than the vertical thickness of the ferroelectric layer 510 of the ferroelectric storage medium 504. While the thickness of the ferroelectric reference layer 534, as measured in the vertical direction (along the z axis in FIG. 5), may depend on the light intensity in the waveguide, in particular approaches, said thickness may be in a range from about 100 μm or less. The ferroelectric reference layer 534 may also have a width, as measured in the horizontal direction (direction along the y axis of FIG. 5) commensurate to the dimensions (e.g., width) of the optical waveguide 522. For instance, the width of the ferroelectric reference layer 534 may have a width that is about equal to or less than the width of the optical waveguide 522.

Comparison of the reference optical signal 532 and the second optical signal 528 to extract information about the phase of the second optical signal 528 (and the polarity of the recorded information in the ferroelectric storage medium 504) may utilize interferometry or other such suitable technique as would become apparent to one having skill in the art upon reading the present disclosure. For instance, when the second and reference optical signals 528, 532, which have the same frequency and polarization, combine and are in phase, constructive interference will occur. However, where the combined second and reference optical signals 528, 532 are out of phase, destructive interference will occur. Accordingly, the phase difference between the second and reference optical signals 528, 532 may change the intensity of the combined/superimposed light arriving at the detector 530, and the resulting intensity may be measured/quantified.

It is important to note that to achieve good detection, there are strict constraints on optical path lengths from the optical signal source 516 through the frequency doubling sites (i.e., the ferroelectric reference layer 534, and the ferroelectric layer 510 of the ferroelectric storage medium 504) and to the detector 530. For instance, the optical paths may preferably be configured such that the second and reference optical signals 528, 532 arrive at the detector 530 with substantially similar polarizations (which may be determined by the type of the optical waveguide 522, e.g., transverse electric (TE), transverse magnetic (TM), etc.) and substantially similar phases (which may be dictated by the overall optical path lengths from the optical signal source 516 to the detector 530). The phase of the second optical signal 528 may thus preferably be in-phase with the reference optical signal 532 or 180 degrees out of phase with the reference optical signal 532 depending on the written data.

In additional approaches, it may be helpful to attenuate the first optical signal 520 that may reach the detector 530 given that the first, second and reference optical signals 520, 528, 532 follow similar paths through the ferroelectric data storage system 500 and that the detector 530 may also respond to the first optical signal 520. Indeed, the first optical signal 520 carries no information and may only add shot-noise to the detector 530. Attenuation of the first optical signal 520 may be achieved by use of an optical component 536 configured to direct the first optical signal differently from the second and reference optical signals 528, 532.

The optical component 536 may be sensitive to the direction and/or frequency of incident optical signals. Consequently, the optical component 536 may be particularly configured to reflect the first optical signal 520 while allowing the second and reference optical signals 528, 532 to pass through the optical component 536 to the detector 530. For instance, in one exemplary approach the first optical signal 520 may be red light (or infrared light) having a wavelength $n\lambda$, and the second and reference optical signals 528, 532 may each be blue light (or green light) having a wavelength $n\lambda/2$. Accordingly, in such an exemplary approach, the optical component 536 may be configured to reflect the red light (or infrared light) while allowing the blue light (or green light) to pass through. In various approaches, this optical component 536 may be a mirror, a lens, a grating, a filter, a selective directional coupler, etc. or other such suitable element/device that directs light having differing wavelengths (or differing wavelength ranges) differently.

In the non-limiting embodiment of FIG. 5, the configuration of the optical signal source 516 may be such that the emitted first optical signal 520 initially propagates in a direction parallel (or substantially parallel) to the ABS 524. The optical component 536 may therefore also be configured to direct the first optical signal 520 into an optical waveguide 522 of the read head 512, in some approaches.

As also shown in FIG. 5, the optical component 536 may be operatively coupled to the upper surface 518 of the head 502. In some approaches, the optical component 536 may be in contact with the upper surface 518 of the head 502. In other approaches, the optical component 536 may be in contact with a separate component that is operatively coupled to the upper surface 518 of the head 502. In yet more approaches, the ferroelectric data storage system 500 may include a plurality (e.g., 2, 3, 4, 5, etc.) of such optical components that are sensitive to the direction of propagation, as well as the frequency, of incident optical signals, and which may be helpful in optimizing different optical paths and preventing spurious optical signals from reaching the detector 530.

Again, the first, second and reference optical signals 520, 528, 532 follow similar paths through the ferroelectric data storage system 500, as noted above. Accordingly, while each of the optical signals 520, 528, 532 are separately illustrated (and spaced apart) in FIG. 5 for clarity, one or more portions of these optical signals may overlap one another (e.g. be coextensive).

Figure 6:
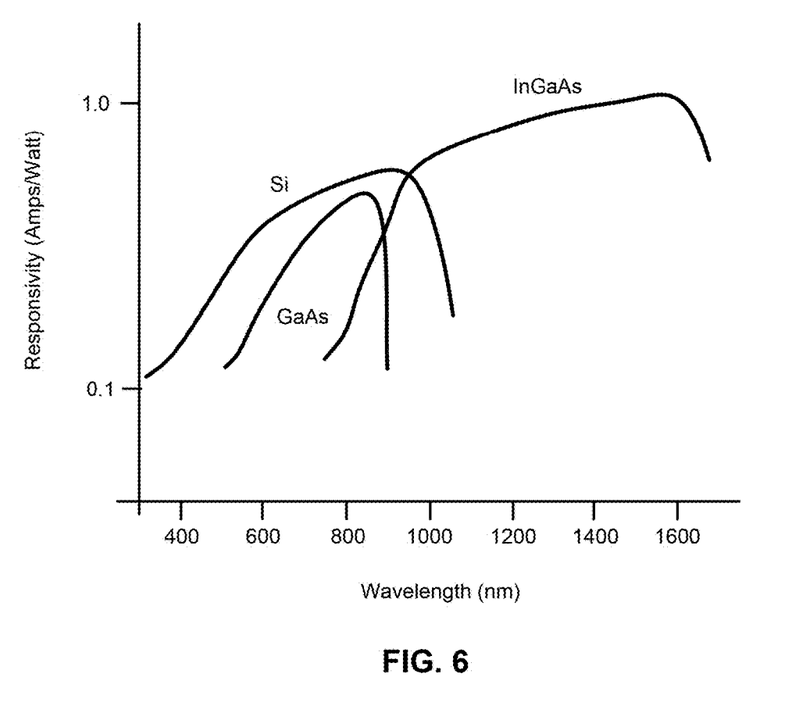
FIG. 6 is a plot illustrating the responsivity at various wavelengths of photodiodes comprising different semiconductor materials.

In yet further approaches, particularly where the detector 530 is a photodiode, detection of the second and reference optical signals 528, 532 may be optimized via selection of materials comprising the photodiode. A photodiode, generally comprised of a semiconductor material, has a range of wavelengths to which it is most sensitive. In particular, a photodiode has a maximum threshold wavelength (minimum energy photon) for eliciting a response. Stated another way, the energy of absorbed photons must be at least equal to or greater than the minimum energy photon threshold of the photodiode in order for the photodiode to elicit a response (e.g., in order for the photovoltaic effect to occur). For instance, as shown in FIG. 6, a silicon photodiode has a maximum threshold wavelength of about 1050 nm. Accordingly, it may be advantageous to tune (e.g., via selection of appropriate materials) the maximum threshold wavelength of a photodiode detector to a value between the fundamental wavelength of the first optical signal 520 and that of the second harmonic (second and reference optical signals 528, 532). In other words, it may be advantageous, in some approaches, to select a photodiode material having a maximum threshold wavelength that is shorter than the wavelength of the first optical signal 520, yet longer than the wavelength of the second and reference optical signals 528, 532.

Figure 7:
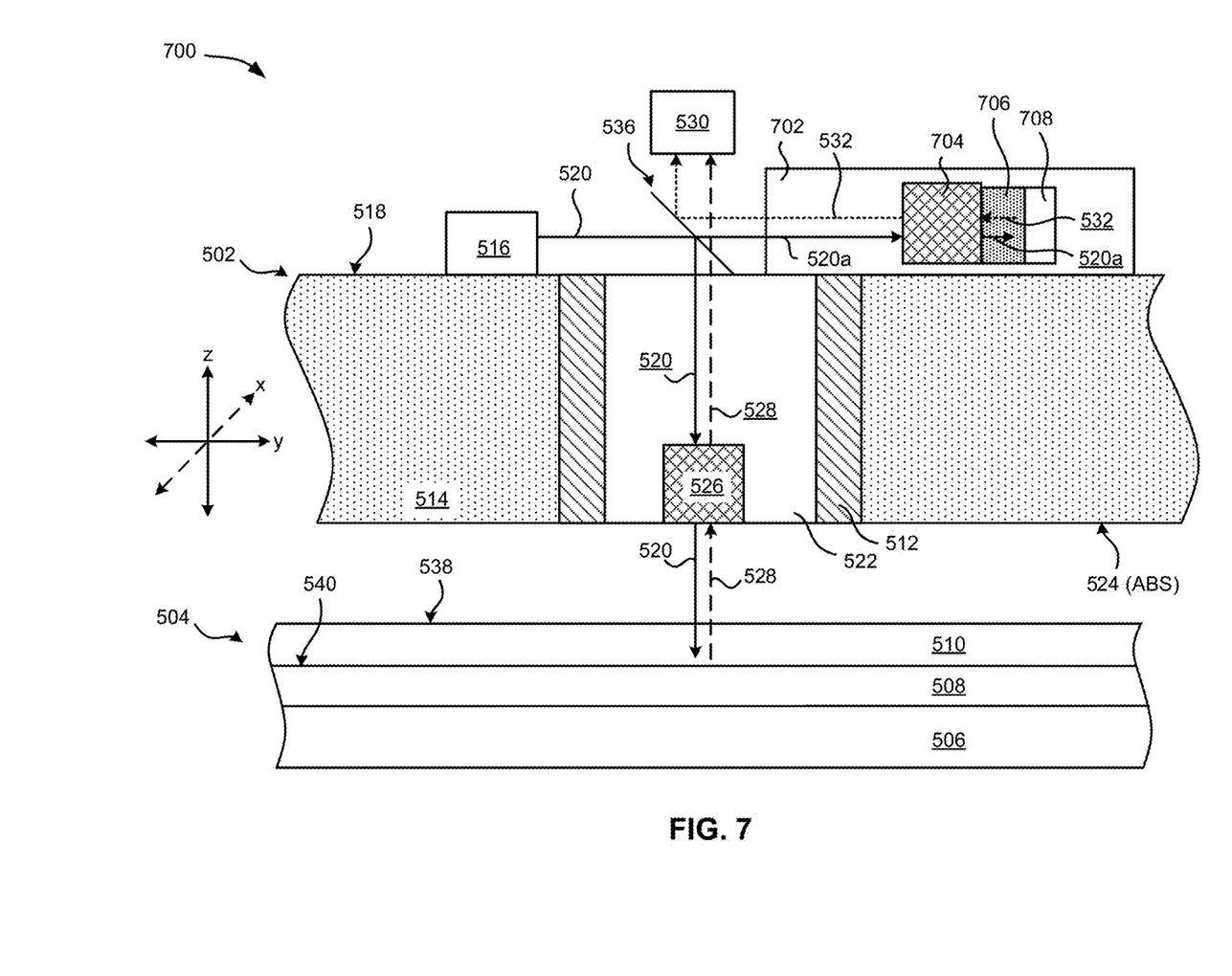
FIG. 7 is a schematic representation of the ferroelectric data storage system of FIG. 5, according to another embodiment.

Referring now to FIG. 7, a ferroelectric data storage system 700 is shown according to one embodiment. As an option, the ferroelectric data storage system 700 may be implemented in conjunction with features from any other embodiment listed herein, such as those described with reference to the other FIGS. Of course, the ferroelectric data storage system 700 and others presented herein may be used in various applications and/or in permutations which may or may not be specifically described in the illustrative embodiments listed herein.

It should be noted that the dimensions of some components illustrated in FIG. 7 may be exaggerated (e.g., larger and/or smaller than would typically be observed) relative to other components, which are in no way intended to limit the invention. Moreover, to simplify and clarify the structures presented, certain features may be omitted from the subsequent figures and/or descriptions. For instance, although FIG. 7 depicts an illustrative cross-sectional view of a ferroelectric data storage system 700, additional and/or alternative components, layers, etc. may be used in the system as would become apparent to one of ordinary skill in the relevant art upon reading the present disclosure. Moreover, unless otherwise specified, one or more components of the ferroelectric data storage system 700 may be of conventional material(s), design, and/or fabricated using conventional techniques as would become apparent to one skilled in the art upon reading the present disclosure.

It is also important to note that the ferroelectric data storage system 700 of FIG. 7 corresponds to an exemplary variation of the ferroelectric data storage system 500 of FIG. 5, and thus may have common numbering therewith.

Comparison between FIGS. 5 and 7 reveals a difference in the position of the ferroelectric reference layer, and the manner in which the reference optical signal is generated. For instance, as shown in FIG. 7, the first optical signal 520, once emitted from the optical signal source 516, initially propagates in a direction parallel (or substantially parallel) to the ABS 524. A portion of the first optical signal 520 may be directed into the optical waveguide 522 via the optical component 536. Additionally, a second portion of the first optical signal, designated 520a for clarity, may pass through the optical component 536 and continue to propagate in a direction parallel (or substantially parallel) to the ABS 524. This second portion of the first optical signal 520a may further be directed into a second optical waveguide 702, which may comprise one or more of the same materials, one or more of the same dimensions, a same design, and/or function in a similar and/or same manner as the optical waveguide 522. As shown in FIG. 7, the second optical waveguide 702 is oriented perpendicular (or substantially perpendicular) to the optical waveguide 522.

As further shown in FIG. 7, the second portion of the first optical signal 520 may be directed toward a second NFT 704. In preferred approaches, the second NFT 704 may comprise one or more of the same materials, one or more of the same dimensions, a same design, and/or function in a similar or the same manner as the NFT 526. For instance, the second NFT 704 may concentrate this second portion of the first optical signal 520a into a small localized region on the ferroelectric reference layer 706. In particular, the metal material(s) and/or configuration of the second NFT 704 may create resonant charge motion (surface plasmons) to yield an intense, localized electric field between the second NFT 704 and the electrically conductive layer 708 coupled to the backside of the ferroelectric reference layer 706. This intense, localized electric field is perpendicular (or substantially perpendicular) to the x-z plane of the ferroelectric reference layer 706, and along (parallel or substantially parallel to) the easy axis of the ferroelectric reference layer 706. Further, in the particular embodiment shown in FIG. 7, there is no (or at most a negligible) spacing between the second NFT 704 and the ferroelectric reference layer 706.

The ferroelectric reference layer 706 (similar to the ferroelectric reference layer 534 of FIG. 5) is configured to frequency double the second portion of the first optical signal 520a, thereby producing the reference optical signal 532 at twice the optical frequency (and half the wavelength) of the second portion of the first optical signal 520a. In various approaches, the ferroelectric reference layer 706 may comprise one or more of the same ferroelectric materials and/or function in a similar or same manner as the ferroelectric layer 510 of the ferroelectric storage medium 504. In other approaches, the ferroelectric reference layer 706 may include one or more different materials as the ferroelectric layer 510.

Moreover, the ferroelectric reference layer 706 may have a fixed polarization to generate the reference optical signal 532 with a known phase. In some approaches, the fixed polarization of the ferroelectric reference layer 706 may be reinforced/maintained with a DC voltage bias.

As noted above, the electrically conductive layer 708 is coupled to the backside of the ferroelectric reference layer 706. In various approaches, the electrically conductive layer 708 may comprise one or more of the same materials and/or function in a similar or same manner as the electrically conductive layer 508 of the ferroelectric storage medium 504.

As additionally shown in FIG. 7, the reference optical signal 532 generated in the ferroelectric reference layer 706 may be reflected therefrom and enter the second NFT 704. While the second NFT 704 may be configured to be resonant at the second portion of the first optical signal 520a, the second NFT 704 may also be resonant at the reference optical signal 532. Such a configuration, where the second NFT 704 may be resonant at both the first and reference optical signals 520a, 532, ensures that the second NFT 704 has very localized sensitivity, and that the localized field for the first optical signal 520a is strong enough to evoke a suitable second-harmonic response, and the second harmonic response (e.g., the reference optical signal 532) is sufficiently coupled back into the second optical waveguide 702. In various approaches, the second NFT 704 may thus be a composite structure comprising a first plasmonic material resonant at the first optical signal 520a, and a second plasmonic material resonant at the reference optical signal 532. This first plasmonic material may be particularly positioned at the surface and/or region of the second NFT 704 on which the first optical signal 520a is incident, whereas the second, plasmonic material may be particularly positioned at the surface and/or region of the second NFT 704 on which the reference optical signal 532 is incident. In one approach, the first and second plasmonic materials may be gold and silver, respectively. It is again of note that for a composite NFT that is resonant at two optical frequencies, both the selection of materials and the design of the NFT are critical.

With continued reference to FIG. 7 after exiting the second NFT 704 and the second optical waveguide 702, the reference optical signal 532 may be directed toward the detector 530 via the optical component 536. As discussed previously, the reference optical signal 532 may be compared to the second optical signal 528 to extract information about the phase of the second optical signal 528.

It is important to note that optical signals 520 and 528 follow similar paths through the ferroelectric data storage system 700. Accordingly, while the optical signals 520 and 528 are separately illustrated (and spaced apart) in FIG. 7 for clarity, one or more portions of these optical signals may overlap one another (e.g. be coextensive).

Likewise, optical signals 520a and 532 follow similar paths through the ferroelectric data storage system 700. The optical signals 520a and 532 are thus separately illustrated (and spaced apart) in FIG. 7 for clarity, however, one or more portions of these optical signals may overlap one another (e.g. be coextensive).

Experiments/Examples

The following experiments and examples pertain to various non-limiting embodiments of the ferroelectric data storage systems described herein. It is important to note that the following experiments and examples are for illustrative purposes only and do not limit the invention in anyway. It should also be understood that variations and modifications of these experiments and examples may be made by those skilled in the art without departing from the spirit and scope of the invention.

Example 1 pertains to a ferroelectric data storage system including a head and a ferroelectric storage medium. The head of Example 1 is similar to that described in FIG. 7 and includes a 1.8 nm thick head overcoat layer. The power in the optical waveguide of the head is 5 mW. The ferroelectric storage medium of Example 1 includes a glass substrate, a 10 nm thick $LiNbO_3$ ferroelectric layer positioned on the substrate, and a 2.5 nm protective overcoat positioned on the ferroelectric layer. The head-medium separation in Example 1 is 3.2 nm. The refractive index of LiNbO3 is assumed to be 2.25.

Example 2 also pertains to a ferroelectric data storage system including a head and a ferroelectric storage medium. Specifically, the heads of Example 1 and Example 2 are identical; however, their respective ferroelectric storage media are not. For instance, the ferroelectric storage medium of Example 2 includes a glass substrate, a 100 nm thick gold electrically conductive layer positioned on the substrate, a 10 nm thick $LiNbO_3$ ferroelectric layer positioned on the electrically conductive layer, and a 2.5 nm protective overcoat positioned on the ferroelectric layer.

Figure 8:
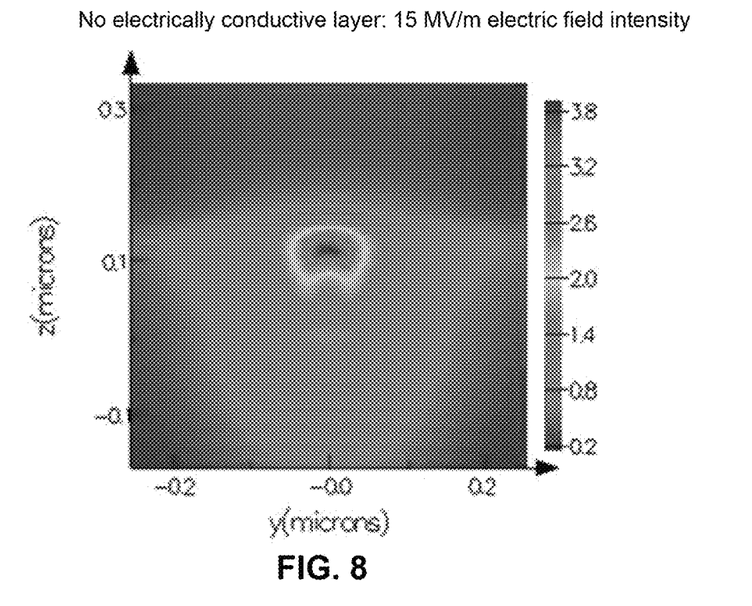
FIG. 8 provides a simulation of the optical field intensity in a ferroelectric storage medium that does not include an electrically conductive layer, according to one embodiment.
Figure 9:
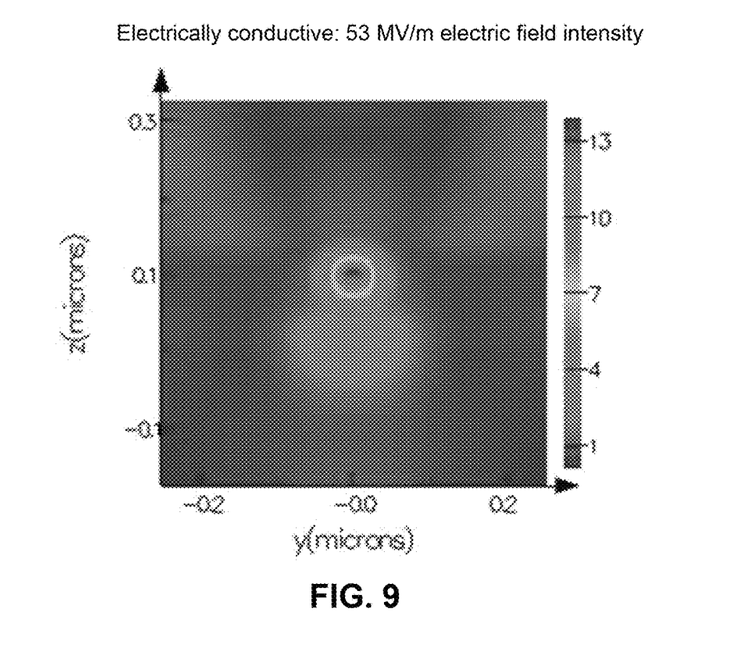
FIG. 9 provides a simulation of the optical field intensity in a ferroelectric storage medium that includes an electrically conductive layer, according to another embodiment.

FIGS. 8 and 9 provide a simulation of the optical field in the ferroelectric storage media of Examples 1 and 2, respectively. The E-field amplitude was measured in the middle of the ferroelectric layer of each Example. Comparison of FIGS. 8 and 9 reveals that the presence of an electrically conductive (metal) layer beneath a ferroelectric layer helps to localize and increase the electric field intensity. For instance, the electric field intensity in the medium of Example 1 (with no electrically conductive layer) is 15 MV/m, whereas the electric field intensity in the medium of Example 2 (with the electrically conductive layer) is 53 MV/m.

With regard to the simulated data provided in FIGS. 8 and 9, it is important to note that the heads of Examples 1 and 2 were optimized for FePt media, not the actual ferroelectric media used in Examples 1 and 2. Optimizing these heads for ferroelectric material may result in even greater electric field intensities within said ferroelectric material.

For instance, optimizing the head of Example 2, and utilization of the ferroelectric storage medium with the electrically conductive layer, may yield a red light electric field intensity in the medium of about 75 MV/m. As the second harmonic coefficient for $LiNbO_3$ is about 20E-12 m/V, the blue light electric field intensity in the medium may be about 112 KV/m. The energy in the volume of 1 bit at 2.5 Tb/squ.in (2.5E-24 $m^3$) may be about 0.7E-24 J. The maximum power flow at the blue light frequency may be about 3.3E-9 W, and the photons per second of blue light at the optical detector (e.g., detector 530 of FIG. 5) may be about 6.6E9 l/s. With a 10% optical path efficiency for blue light, and about 8 photons defining a bit, the bits per second from the channel detector may be about 80 Mb/s. In light of the above, and utilizing pulse-writing with a 20% duty cycle (500 ps/2500 ps), where the blue light peak power goes up by 25 for ⅕ of the time, the resulting data rate may be about 400 Mb/s. It is again important to note that these parameters and calculations are in no way limiting.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
a head, comprising:
an optical signal source configured to emit a first optical signal, and
a near-field transducer (NFT) configured to focus the first optical signal on a moving ferroelectric storage medium positioned below the head; and
a detector operatively coupled to the head, the detector being configured to detect a second optical signal generated in and reflected from the ferroelectric storage medium, the second optical signal having twice the optical frequency as the first optical signal.

2. The system as recited in claim 1, wherein the NFT includes one or more materials and/or has a geometry configured to facilitate resonance with the first and second optical signals.

3. The system as recited in claim 2, wherein an upper surface of the NFT includes a first material resonant with the first optical signal, and wherein a bottom surface of the NFT includes a second material resonant with the second optical signal.

4. The system as recited in claim 3, wherein the first material includes gold, and wherein the second material includes silver.

5. The system as recited in claim 1, wherein the first optical signal is red or infrared light.

6. The system as recited in claim 1, wherein an optical electric field component of the first optical signal and/or the second optical signal is oriented perpendicular to an upper surface of the ferroelectric storage medium.

7. The system as recited in claim 1, wherein the optical signal source is a pulsed laser.

8. The system as recited in claim 1, wherein the head comprises at least one optical waveguide configured to direct the first optical signal from the optical signal source to the NFT.

9. The system as recited in claim 8, wherein the head includes a ferroelectric reference layer configured to frequency double the first optical signal, thereby generating a reference optical signal at twice the optical frequency of the first optical signal.

10. The system as recited in claim 9, wherein the ferroelectric reference layer comprises one or more ferroelectric materials selected from the group consisting of: LiNbO3, LiTaO3, BaTiO3, SrTiO3, KTiOPO4, PbTiO3, KH2PO4, β-BaB2O4, LiB3O5.

11. The system as recited in claim 9, wherein the detector is configured to detect the sum of the reference optical signal and the second optical signal.

12. The system as recited in claim 9, comprising at least one optical component operatively coupled to the head and positioned between the head and the detector, the optical component being configured to only allow the second optical signal and the reference optical signal to pass through to the detector.

13. The system as recited in claim 12, wherein the optical component is selected from the group consisting of: an optical filter, an optical grating, and a selective directional coupler.

14. The system as recited in claim 9, wherein the optical waveguide is configured to direct the reference optical signal generated in and reflected from the ferroelectric reference layer to the detector, and the second optical signal generated in and reflected from the ferroelectric storage medium to the detector.

15. The system as recited in claim 9, wherein the head comprises a second optical waveguide configured to direct the reference optical signal generated in and reflected from the ferroelectric reference layer to the detector, and the second optical signal generated in and reflected from the ferroelectric storage medium to the detector.

16. The system as recited in claim 9, comprising a processing device operatively coupled to the detector, the processing device configured to demodulate a phase of the second optical signal with respect to the reference optical signal.

17. The system as recited in claim 1, comprising the ferroelectric storage medium, wherein the ferroelectric storage medium comprises: a substrate; an electrically conductive layer positioned above the substrate; and a ferroelectric layer positioned above the electrically conductive layer.

18. The system as recited in claim 17, wherein the ferroelectric layer comprises one or more ferroelectric materials configured to configured to frequency double the first optical signal, thereby generating the second optical signal.

19. A ferroelectric data storage system, comprising:
at least one head as recited in claim 1;
a ferroelectric medium;
a drive mechanism for passing the ferroelectric medium over the at least one head; and
a controller electrically coupled to the at least one head for controlling operation of the at least one head.

* * * * *